United States Patent [19]
Duddleston

[11] Patent Number: 5,887,436
[45] Date of Patent: Mar. 30, 1999

[54] PORTABLE COOLED PET CARRIER

[76] Inventor: Beverly J. Duddleston, 601 Clarke St., Eagle Lake, Tex. 77434

[21] Appl. No.: 964,786

[22] Filed: Nov. 5, 1997

[51] Int. Cl.⁶ .................................................. F25B 21/02
[52] U.S. Cl. ............................ 62/3.62; 62/3.3; 62/457.9; 119/500
[58] Field of Search .............................. 62/3.2, 3.3, 3.6, 62/3.61, 3.62, 457.9, 239, 244; 119/496, 497, 453, 483, 500, 512

[56] References Cited

U.S. PATENT DOCUMENTS

| | | | |
|---|---|---|---|
| 4,119,084 | 10/1978 | Eckels | 126/270 |
| 4,827,872 | 5/1989 | Sommers | 119/19 |
| 4,939,911 | 7/1990 | Mandell | 62/239 |
| 5,216,977 | 6/1993 | Allen | 119/19 |
| 5,727,503 | 3/1998 | Whittaker | 119/500 |

*Primary Examiner*—William Doerrler
*Attorney, Agent, or Firm*—Joseph N. Breaux

[57] ABSTRACT

A cooled pet carrier comprising a housing for housing therein a pet and a cooling system. The cooling system comprises a Peltier module having a Peltier effect and a cooling system housing having a slidable lid member wherein the slidable lid member serves to re-circulate cooled air from the interior of the housing to the Peltier module when the slidable lid member is in a first position and serves to allow stale air to vent from the interior of the housing and be replenished with fresh air when the slidable lid member is in a second position.

15 Claims, 2 Drawing Sheets

PORTABLE COOLED PET CARRIER

TECHNICAL FIELD

The present invention relates to pet carriers and, more particularly, to a portable cooled pet carrier comprising a portable housing cooled by a portable cooling system using a Peltier module having a Peltier effect wherein the portable cooling system comprises a slidable lid member which serves to re-circulate cooled air from the interior of the portable housing to the Peltier module when in a first position and serves to allow stale air to vent from the interior of the portable housing and be replenished with fresh air.

BACKGROUND OF THE INVENTION

Pet owners often travel with their pets. For example, a pet owner having their pet with them may stop off at the grocery. However, the pet must be left in the vehicle until the owner returns. In other instances, pet owners take their pets with them on road trips. However, during the road trips the pet owner may stop at a restaurant. Again, the pet must be left in the vehicle until the owner returns.

During the summer months the temperature rises to 90 plus degrees and in some instances over 100 degrees. Therefore, a pet left in the vehicle is exposed to extreme heat. In order to provide the pet with a breeze or fresh air while the pet owner is away from the vehicle, the owner, on occasion, has cracked the windows of the vehicle. As can be appreciated, the crack must be sufficiently small to prevent the pet from jumping out of the cracked window and to prevent theft of the vehicle. As a result, the cracked window typically does not provide a sufficient stream of air to cool the pet.

Several devices have been patented which are aimed at portable cooled containers or cooled comfort devices.

U.S. Pat. No. 5,355,694, by Marrow et al., entitled "MOBILE COOLER" discloses a container cooled by air from a vehicle's air-conditioning system.

U.S. Pat. No. 5,181,555, by Chruniak, entitled "PORTABLE FOOD AND BEVERAGE STORAGE UNIT MOUNTED ADJACENT AN AIR VENTILATOR" discloses a portable storage unit for food or drink which is mounted over an air ventilator of an air-conditioner unit.

U.S. Pat. No. 4,006,604, by Seff, entitled "AIR CONDITIONED PILLOW" discloses a pillow having an inlet for cool air connected to a portable air-conditioning unit.

U.S. Pat. No. 2,461,432, by Mitchell, entitled "AIR CONDITIONING DEVICE FOR BEDS" discloses a bed having attached thereto a cooling unit.

It can be readily seen that there exists the continuing need for a portable cooled pet carrier comprising a portable housing cooled by a portable cooling system using a Peltier module having a Peltier effect wherein the portable cooling system comprises a slidable lid member which serves to re-circulate cooled air from the interior of the portable housing to the Peltier module when in a first position and serves to allow stale air to vent from the interior of the portable housing and be replenished with fresh air.

SUMMARY OF THE INVENTION

The preferred embodiment of the portable cooled pet carrier of the present invention solves the aforementioned problems in a straight forward and simple manner. What is provided is a portable cooled pet carrier comprising a portable housing cooled by a portable cooling system using a Peltier module having a Peltier effect wherein the portable cooling system comprises housing having a slidable lid member which serves to re-circulate cooled air from the interior of the portable housing to the Peltier module when in a first position and serves to allow stale air to vent from the interior of the portable housing and be replenished with fresh air.

In view of the above, an object of the present invention is to provide a portable cooled pet carrier having a portable cooling system which serves to provide a comfortable habitat for the pet during uncomfortable temperatures.

Another object of the present invention is to provide a portable cooled pet carrier having a handle to allow the portable cooled pet carrier to be easily carried from place to place.

A further object of the present invention is to provide a portable cooled pet carrier which comprises a compact and lightweight cooling system which does not significantly increase the weight of the portable cooled pet carrier.

It is a still further object of the present invention to provide a portable cooled pet carrier which is powered by a battery.

It is a still further object of, the present invention to provide a portable cooled pet carrier which is powered by the car battery.

It is a still further object of the present invention to provide a portable cooling system having a housing with a first compartment and a second compartment and a slidable lid member for recirculating cooled air from the second compartment to the first compartment when such slidable lid member is in a first position and serves to allow stale air to exit the portable cooled pet carrier chamber in a second position for replenishing such chamber with fresh air.

It is a still further object of the present invention to provide a portable cooled pet carrier with a removable insulating blanket fitted to the carrier dimensions to insulate the carrier from hot and cold air.

In view of the above objects, it is a feature of the present invention to provide a portable cooled pet carrier which is simple to use.

Another feature of the present invention is to provide a portable cooled pet carrier which is simple and inexpensive to manufacture.

A further object of the present invention is to provide a portable cooled pet carrier which is economical to use.

The above and other objects and features of the present invention will become apparent from the drawings, the description given herein, and the appended claims.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
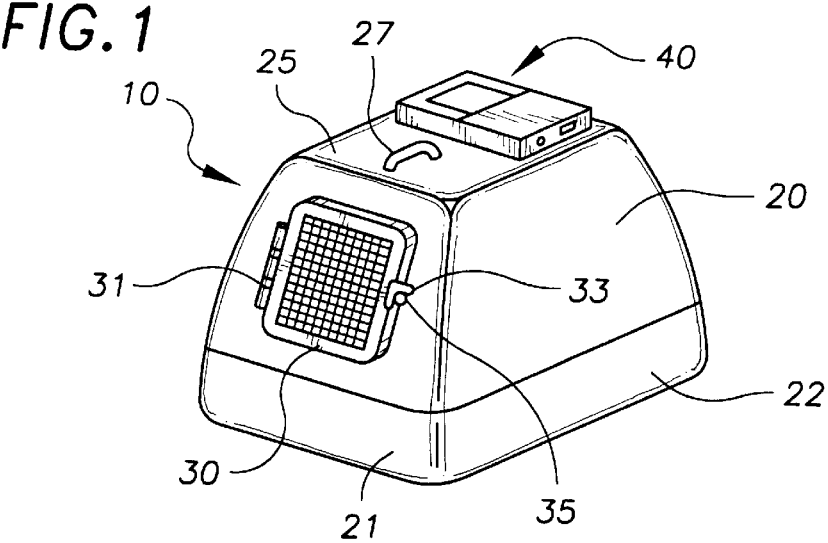
FIG. 1 illustrates a perspective view of the preferred embodiment of the portable cooled pet carrier of the present invention with the slidable lid member removed.

Referring now to the drawings, and in particular FIG. 1, the portable cooled pet carrier of the present invention is designated generally by the numeral 10. Portable cooled pet carrier 10 is constructed to allow a pet owner to keep their pet cool and safe while left along in a vehicle. Moreover, portable cooled pet carrier 10 allows the pet to be cooled while just carrying portable cooled pet carrier 10. Portable cooled pet carrier 10 is generally comprised of housing 20, door member 30 and portable cooling system 40.

Housing 20 comprises front wall 21, first side wall 22, a second side wall (not shown) parallel to first side wall 22, a back wall (not shown) parallel to front wall 21, a bottom wall (not shown) and top wall 25 coupled together to form a hollow chamber for placing therein a pet (not shown). Front wall 21 has formed therein an opening which permits access by the pet into the hollow chamber. Top wall 25 has coupled thereto handle member 27 for allowing portable cooled pet carrier 10 to be easily carried from place to place. Top wall 25 has formed therein an aperture which has coupled therearound housing 41 of portable cooling system 40.

Door member 30 has one side hingely coupled to front wall 21 via hinge member 31. Door member 30 is dimensioned to cover said opening wherein door member 30 and said opening serves as a door way to allow the pet to be fully enclosed within the hollow chamber. The other side of door member 30 has coupled thereto latch means 33 wherein latch means latches to latch receiving means 35 coupled to front wall 21 thereby preventing the pet from exiting. In the preferred embodiment, door member 30 is made of clear plastic having a plurality of ventilation holes formed therein. Nevertheless, door member 30 may be any other suitable door used on pet carriers. However, the ventilation holes should not compromise the cooling effect in the hollow chamber.

Latch means 33 and latch receiving means 35 serve as a locking mechanism which prevents the pet from pushing door member 30 open and escaping from the hollow chamber. Nevertheless, in lieu of latching means 33 and receiving means 35 any other locking mechanism may be substituted which would serve to prevent door member 30 from being pushed open by the pet.

Figure 2:
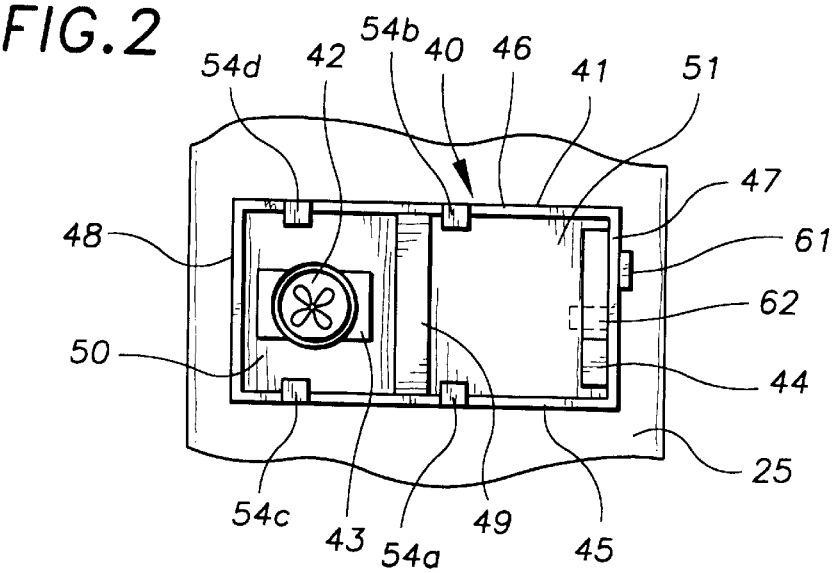
FIG. 2 illustrates a top view of the cooled pet carrier of FIG. 1 with the slidable lid member removed.
Figure 3:
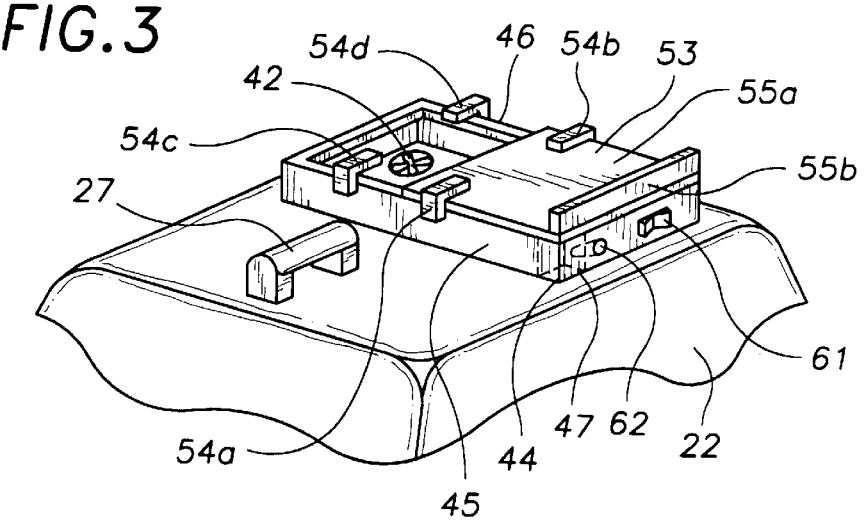
FIG. 3 illustrates a partial view of the top of the portable cooled pet carrier showing the details of the portable cooling system with the slidable lid member in the first position; and, FIG. 4 illustrates a side view of the portable cooling system of the present invention with the slidable lid member in the first position.
Figure 4:
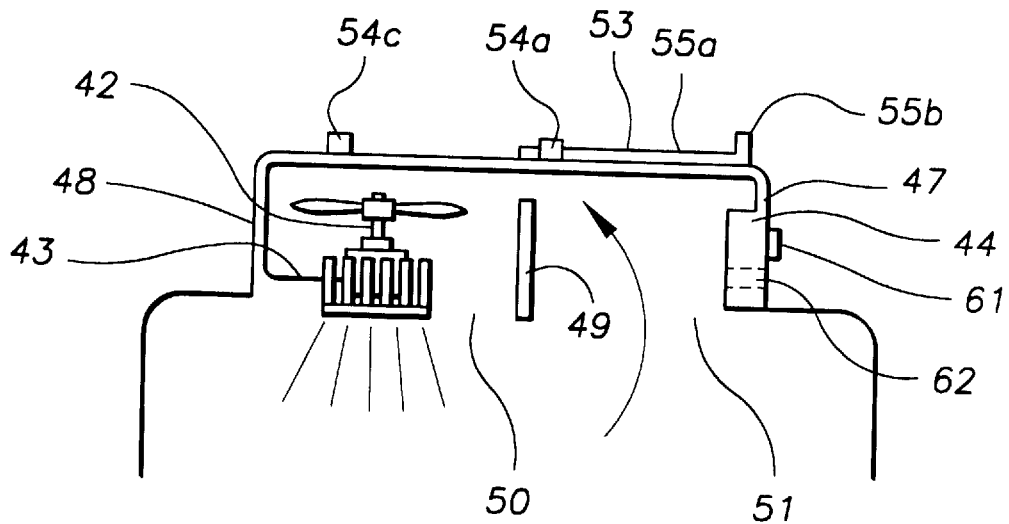

Referring now to FIGS. 2-4, portable cooling system 40 comprises housing 41, fan means 42, Peltier module 43 and power means 44. Housing 41 comprises front wall 45, back wall 46 parallel to front wall 45 and first and second side walls 47 and 48 parallel to each other and perpendicular to front wall 45 and back wall 46. In the preferred embodiment, housing 41 is substantially rectangularly shaped. Front wall 45, back wall 46 and first and second side walls 47 and 48 have a first height.

Housing 41 further comprises divider wall 49 coupled perpendicularly to front wall 45 and back wall 46 wherein divider wall 49 divides housing 41 into first compartment 50 and second compartment 51. Divider wall 49 has a second height wherein a gap is formed between the top edge of divider wall 49 and the top edge of front wall 45 and back wall 46.

Housing 41 further comprises slidable lid member 53 and a plurality of guide members 54a, 54b, 54c, and 54d. Guide members 54a and 54b are coupled to the top edge of front wall 45 and guide members 54c and 45d are coupled to the top edge of back wall 46. Guide members 54a and 54c are parallelly aligned and positioned in close proximity to divider wall 49. Thereby, as slidable lid member 53 is in a first position, slidable lid member 53 is secured over the opening of second compartment 51 via guide members 54a and 54c.

Slidable lid member 53 is dimensioned to cover the opening defined by that portion of housing 41 to one side of divider wall 49. Slidable lid member 53 comprises planar member 55a and flange member 55b coupled perpendicularly to planar member 55a. Flange member 55b serves to allow a user to apply a force of pressure thereto to slide slidable lid member 53 from the first position to a second position or remove such slidable lid member 53 from housing 41. Flange member 55b has a height higher then guide members 54a and 54c wherein as slidable lid member 53 is slid into a second position, guide members 54a and 54c serve to stop the forward sliding movement of slidable lid member 53. Guide members 54b and 54d are parallelly align and positioned on the top edge of front wall 45 and back wall 46 of first compartment 50.

Slidable lid member 53 allows cooled air from the hollow chamber to be re-circulated to Peltier module 43 via second compartment 51. The gap formed by divider wall 49 serves to permit air from second compartment 51 to vent into first compartment 50 when slidable lid member 53 is in the first position, as best seen in FIG. 4. Thereby, the cooled air of the hollow chamber can be further cooled when re-circulated to Peltier module 43. When slidable lid member 53 is in a second position covering the opening of first compartment 50 or removed, stale air from the hollow chamber is able to vent out of the hollow chamber and fresh air is able to permeate into the hollow chamber. Thereby, the air in the hollow chamber may be replenished with fresh air.

First compartment 50 has supported therein fan means 42 and Peltier module 43. Fan means 42 serves to siphon air from outside of portable cooled pet carrier 10 and divert such air to Peltier module 43. Moreover, fan means 42 siphons the cooled air from second compartment 51 and re-circulates the cooled air to Peltier module 43. Nevertheless, fan means 42 serves to create circulating air in the hollow chamber to cool the air therein. When slidable lid member 53 is in the second position, first compartment 50 is closed off from air except through the gap.

Peltier module 43 produces a Peltier effect when direct current electricity is applied to Peltier module 43. Peltier module 43 comprises a solid state device which produces a cooled surface area when direct current electricity is applied thereto wherein the cooled surface area serves to cool the air as the air is applied thereto. Direct current electricity is supplied to fan means 42 and Peltier module 43 via wire means 70.

Portable cooling system 40 further comprises on/off switch means 61 and cigarette adaptor connector means 62 wherein cigarette adaptor connector means 62 would couple therein a power cord (not shown) having one end receivable in cigarette adaptor connector means 62 and the other end receivable in the cigarette lighter (not shown) of a vehicle. In the preferred embodiment, on/off switch means 61 and cigarette adaptor connector means 62 are coupled to first side wall 47. Furthermore, power source 44 is coupled in a battery compartment in second compartment 51. Nevertheless, the battery compartment may be positioned anywhere in housing 41 of portable cooling system 40.

In the preferred embodiment, power source 44 is a 12-Volt nickel-cadmium battery. Moreover, battery may be any rechargeable battery which may be recharged via the vehicle's battery and other battery recharging devices (not shown).

Figure 5:
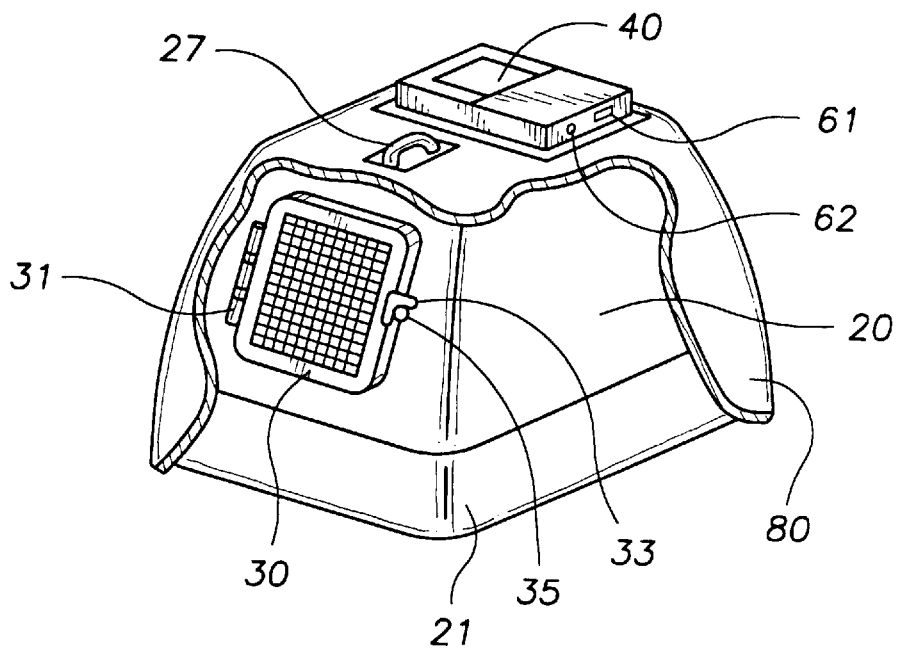
FIG. 5 illustrates a perspective view of the preferred embodiment of the portable cooled pet carrier of the present invention having a fitted insulating blanket.

Referring now to FIG. 5, portable cooled pet carrier 10 may further comprise removable insulating blanket 80. Preferably, insulating blanket 80 is fitted to the dimensions of housing 20 to insulate housing 20. Thereby, portable cooled pet carrier 10 can further maintain the cooled air within the hollow chamber. Moreover, during winter months, the insulating blanket 80 would serve to insulate the hollow chamber from the cold air.

While the present invention provides for portable cooling system 40 coupled to top wall 25 of housing 20, nevertheless, portable cooling system 40 may be clipped onto a cage-like door member wherein the cage-like door would allow cool air to enter the hollow chamber.

It is noted that the embodiment of the portable cooled pet carrier described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cooled pet carrier comprising:
    a housing for housing therein;
    a cooling system comprising a Peltier module having a Peltier effect and a cooling system housing having a slidable lid member wherein said slidable lid member serves to re-circulate cooled air from the interior of said housing to said Peltier module when said slidable lid member is in a first position and serves to allow stale air to vent from the interior of said housing and be replenished with fresh air when said slidable lid member is in a second position; and
    a removable insulating blanket fitted to the dimensions of said housing.

2. The cooled pet carrier of claim 1, wherein said cooling system housing comprises:
    a front wall;
    a back wall parallel to said front wall;
    first and second side walls parallel to each other and perpendicular to said front wall and said back wall wherein said front wall, said back wall and said first and second side walls have a first height; and,
    a divider wall coupled perpendicularly to said front wall and said back wall wherein said divider wall divides said cooling system housing into a first compartment and a second compartment, and wherein said divider wall has a second height and a gap is formed between a top edge of said divider wall and a top edge of said front wall and said back wall.

3. The cooled pet carrier of claim 2, wherein said cooling system further comprises:
    fan means for siphon air from outside of said portable housing and for diverting the air to said Peltier module; and
    a power source for delivering power to said fan means and said Peltier module.

4. The cooled pet carrier of claim 3, wherein said fan means siphons the air from the second compartment via said gap and re-circulates the air to said Peltier module when said slidable lid member is in said second position, and wherein said fan means serves to create circulating air in the interior of said portable housing.

5. The cooled pet carrier of claim 3, wherein said power source comprises a rechargeable battery.

6. The cooled pet carrier of claim 3, wherein said power source comprises a cigarette lighter adaptor connecting means for coupling said power source to a vehicles battery.

7. The cooled pet carrier of claim 2, wherein said first compartment is closed off from air except through said gap when said slidable lid member is in said second position.

8. The cooled pet carrier of claim 1, wherein a top wall of said housing has coupled thereto a handle member for allowing said housing to be carried from place to place.

9. A portable cooled pet carrier comprising:
    a portable housing for housing therein a pet;
    a portable cooling system comprising a Peltier module having a Peltier effect and a cooling system housing having a slidable lid member wherein said slidable lid member serves to re-circulate cooled air from the interior of said housing to said Peltier module when said slidable lid member is in a first position and serves to allow stale air to vent from the interior of said housing and be replenished with fresh air when said slidable lid member is in a second position, and
    a removable insulating blanket fitted to the dimensions of said housing.

10. The portable cooled pet carrier of claim 9, wherein said cooling system housing comprises:
    a front wall;
    a back wall parallel to said front wall;
    first and second side walls parallel to each other and perpendicular to said front wall and said back wall wherein said front wall, said back wall and said first and second side walls have a first height; and,
    a divider wall coupled perpendicularly to said front wall and said back wall wherein said divider wall divides said cooling system housing into said first compartment and said second compartment, and wherein said divider wall has a second height and a gap is formed between a top edge of said divider wall and a top edge of said front wall and said back wall.

11. The portable cooled pet carrier of claim 10, wherein said portable cooling system further comprises:
    fan means for siphon air from outside of said portable housing and for diverting the air to said Peltier module; and
    a power source for delivering power to said fan means and said Peltier module.

12. The portable cooled pet carrier of claim 11, wherein said fan means siphons the air from the second compartment via said gap and re-circulates the air to said Peltier module when said slidable lid member is in said second position, and wherein said fan means serves to create circulating air in the interior of said portable housing.

13. The portable cooled pet carrier of claim 11, wherein said power source comprises a rechargeable battery.

14. The portable cooled pet carrier of claim 11, wherein said power source comprises a cigarette lighter adaptor connecting means for coupling said power source to a vehicles battery.

15. The portable cooled pet carrier of claim 9, wherein a top wall of said portable housing has coupled thereto a handle member for allowing said portable housing to be carried from place to place.

* * * * *